United States Patent
Bösl et al.

[11] Patent Number: 6,095,297
[45] Date of Patent: Aug. 1, 2000

[54] HYDRAULIC SYSTEM FOR A POWER-TAKE-OFF CLUTCH

[75] Inventors: Theodor Bösl, Marktoberdorf; Jakob Mayer, Ruderatshofen; Johann Reisch, Marktoberdorf, all of Germany

[73] Assignee: AGCO GmbH & Co., Germany

[21] Appl. No.: 09/295,834

[22] Filed: Apr. 21, 1999

[30] Foreign Application Priority Data

Apr. 25, 1998 [GB] United Kingdom .................... 9808743

[51] Int. Cl.⁷ ............................ F16D 67/04; B60K 17/28
[52] U.S. Cl. .............................................. 192/12 C; 74/11
[58] Field of Search ........................ 192/12 C, 18 A, 192/52.4, 85 R, 109 F; 74/11, 15.4

[56] References Cited

U.S. PATENT DOCUMENTS

| | | |
|---|---|---|
| 3,669,229 | 6/1972 | Ronayne et al. ...................... 192/12 C |
| 3,893,552 | 7/1975 | Dahl . |
| 4,029,189 | 6/1977 | Freiburger . |
| 4,179,887 | 12/1979 | Ridder et al. . |
| 4,296,649 | 10/1981 | Marquart ................................ 74/11 X |
| 4,411,345 | 10/1983 | Haight et al. ......................... 192/12 C |

FOREIGN PATENT DOCUMENTS

| | | |
|---|---|---|
| 097210 | 1/1984 | European Pat. Off. . |
| 2159228 | 11/1985 | United Kingdom . |

*Primary Examiner*—Richard M. Lorence
*Attorney, Agent, or Firm*—MacMillan, Sobanski & Todd, LLC

[57] ABSTRACT

A hydraulic system for a power-take-off in a utility vehicle is described, having a pump (8) supplying hydraulic fluid to the clutch (1), the brake (2) and a lubricating circuit, a control valve for engaging and releasing the clutch and a device containing a pressure-limiting valve (12) which makes a high system pressure available when the clutch is engaged and a lower system pressure when the clutch is released.

In order to keep loss of power in the pump as low as possible and reduce the number of components required in a hydraulic system of this type, the system pressures are controlled by the pressure applied to the engaged clutch. Consequently, the system pressures can be adjusted regardless of the design of control valve used. This means that less expensive 3/2-way valves or 3/2-control valves can be used. This also has an advantage in that different system pressures can be produced using a single pressure-limiting valve. The hydraulic system is suitable for all types of utility vehicle with a power-take-off.

1 Claim, 1 Drawing Sheet

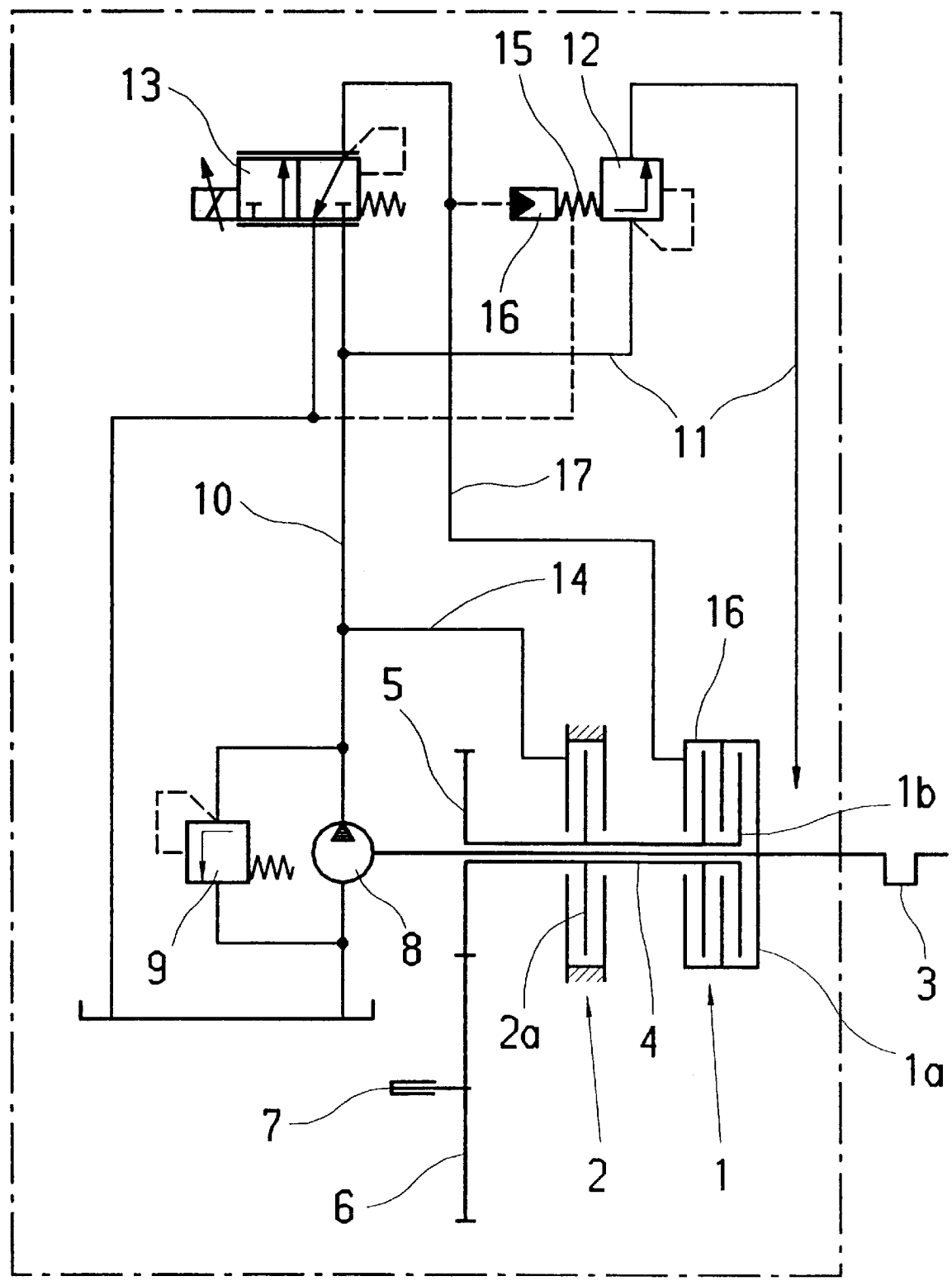

HYDRAULIC SYSTEM FOR A POWER-TAKE-OFF CLUTCH

BACKGROUND OF THE INVENTION

The invention relates to a hydraulic system for a power-take-off clutch in a utility vehicle such as an agricultural tractor.

As a rule, power-take-offs in utility vehicles such as agricultural tractors, for example, are engaged for only some of the time that the vehicle is used. When engaged, the clutch has to transmit in large torque to the power-take-off to drive an implement of some sort. Furthermore, substantial quantities of oil have to be delivered to the lubricating circuit in order to lubricate and cool the power-take-off clutch and gearbox. For this reason, the powertake-off hydraulic system is designed to operate at a relatively high system pressure. When the power-take-off clutch is released, only the power-take-off brake, which is subject to minimal loading, is engaged and only the part of the released clutch on the drive side is supplied with lubricating oil. A significantly lower system pressure would be sufficient for this purpose. Since the power requirement of the pump depends on the system pressure, the pump will undergo a considerable loss of power if the system pressure remains constant, which in turn causes the hydraulic medium to heat up considerably.

A hydraulic system has already been disclosed which provides a means of keeping the loss of power in the pump as low as possible, in which a high system pressure is applied to the power-take-off (PTO) clutch and a comparatively reduced system pressure is applied to the PTO brake. The known hydraulic system contains a control valve for selecting the clutch or the brake and two pressure-limiting valves, the first of these pressure-limiting valves limiting the pump pressure to the high system pressure as soon as the clutch is selected via the control valve and the second pressure-limiting valve limiting the pump pressure to the lower system pressure when the brake is engaged as soon as the brake is selected via the control valve. Hydraulic fluid flowing off through the pressure-limiting valves is fed into the lubricating circuit via respective check-valves. The disadvantage of the known system is the relatively high number of components it requires. In addition, the control valve, a 4/2 way valve, is restricted to use on hydraulic systems for PTOs with alternately selected clutch and brake.

SUMMARY OF THE INVENTION

The objective of the invention is to reduce the construction requirements for a hydraulic system of the type described above.

According to the invention, a system is provided having the features of claim 1 hereto.

The objective is achieved by the invention due to the fact that the system pressures are controlled directly by the pressure applied to the engaged clutch. This means that the system pressures can be adjusted irrespective of the design of the control valve used. Consequently, less expensive 3/2-way valves or 3/2-control valves can be used as the control valve. Furthermore, only one, adjustable, limiting valve is required.

The feature whereby the closing force of the pressure-limiting valve depends on the pressure applied to the clutch has an advantage in that different system pressure can be generated with single, adjustable, pressure-limiting valve only.

BRIEF DESCRIPTION OF THE DRAWING

An embodiment of the invention be described in more detail below, by way of example only, with reference to a drawing, which is a diagram of a hydraulic system according to the invention.

DETAILED DESCRIPTION

An fully self-sufficient PTO at the front end of an agricultural tractor has a multiple-disc clutch 1 which is engaged by hydraulic pressure, and a brake 2. Clutch 1 and brake 2 can be alternately mechanically operated, which means that when the clutch 1 is engaged, the brake 2 is necessarily mechanically released and when the clutch 1 is released, the brake 2 is engaged by a spring-operated mechanism. The structural design of this clutch/brake system is described in detail in co-pending patent application No. 9808289.4.

It should be noted that the brake is only actuated hydraulically to the extent that when there is pressure in the hydraulic system at all, a hydraulically actuated brake "back stop" moves into an "active" position in which disengagement of the clutch automatical ly results in engagement of the brake. When there is no system pressure, the brake is "disabled" by this "back stop" moving away from the "active" position.

The half of the clutch 1a at the drive end is driven by the engine 3 of the tractor. A shaft 4 extending from the half of the clutch 1b at the output end bears a friction disc 2a of the brake 2 and a set 5 of different gears forming a number of transmission ratios in conjunction with gears of another set 6, by means of which a specific speed can be set on the PTO shaft 7.

Hydraulic fluid is delivered to the clutch 1 and the brake 2 by means of a hydraulic system, which is supplied by a pump 8 driven by the engine 3. The pump 8 delivers hydraulic fluid at a maximum pressure of 25 bar, pre determined by a pressure-limiting valve 9, to a line 10, which is shut off in terms of pressure by means of another pressure-limiting valve 12 lying on a line 11 branching off therefrom. At the output end, the line 1 runs from the pressure-limiting valve 12 into a lubricating circuit. The pressure-limiting valve 12 limits the pressure to a system pressure of either 18 bar or 4 bar in the line 10 leading to a control valve 13 and in line 14 leading to the brake 2. Which of the system pressure actually prevails will depend on the level of the closing force of the pressure-limiting valve 12, which can be adjusted by the variable initial tension of a closing spring 15. The initial tension of the closing spring 15 can in turn be adjusted by applying to a piston 16 the pressure prevailing in a line 17 running from the control valve 12 to the clutch 1. The line 17 feeds a hydraulic clutch actuator (not shown).

The control valve 13 can be infinitely adjusted between a first control position in which the line 17 to the clutch is vented and without pressure and a second control position in which the line 17 is connected to the line 10 and freely transmits the system pressure prevailing in line 10. In the first of the above-mentioned control positions, the piston 16 and the clutch 1 are not pressurised because there is no pressure in line 17. The closing spring 15 of the pressure-limiting valve 12 is pre-loaded in such a way that when no pressure is being applied to the piston 16 in line 17 a low system pressure of 4 bar is generated. This pressure keeps the brake 2 in the "active" position by pressurising it.

When switched into the second of the above-mentioned control positions, increasing pressure is applied to line 17 and hence the clutch 1 and the piston 16. Starting from the current level of 4 bar system pressure in line 10, the pressure applied to the clutch 1 and the piston 16 in line 17 is increased, so that the piston 16 is pushed increasingly in the direction in which it will apply a greater tension to the closing spring 15 until it finally rests against a stop, not illustrated. In this situation, the closing force of the pressure-limiting valve 12 reaches a maximum value, corresponding to a system pressure of 18 bar in line 10. With this pressure, the clutch 1 is finally full engaged. The brake "back stop" will remain in the "active" position, but the movement of the clutch into engagement as discussed above, necessarily disengages the brake.

When the control valve 13 is switched from the first of the above-mentioned control positions (clutch OUT) into the second (clutch IN), there will be controlled rise in pressure line 17 so that an implement driven by the PTO shaft 7 will reach a desired speed after approximately 2–3 seconds. Consequently, the PTO shaft 7 can be engaged under load smoothly and without damage to the PTO.

What is claimed is:

1. A hydraulic system for operating a power-take-off having an input shaft for use in a vehicle having an engine, the hydraulic system comprising:
   a pump for delivering pressurized hydraulic fluid to a line;
   a clutch connected to said line and adapted to selectively connect the engine to rotatably drive the input shaft of the power-take-off;
   a brake connected to said line and adapted to selectively retard rotation of the input shaft of the power-take-off;
   a control valve connected to said line and operable in a first mode for not providing pressurized fluid in said line to said clutch and in a second mode for providing pressurized fluid in said line to said clutch;
   a pressure limiting valve that is responsive to the presence of said pressurized fluid in said line for varying the magnitude thereof.

* * * * *

UNITED STATES PATENT AND TRADEMARK OFFICE
CERTIFICATE OF CORRECTION

PATENT NO. : 6,095,297
DATED : August 1, 2000
INVENTOR(S) : Theodor Bosl, Jakob Mayer, and Johann Reisch It is certified that error appears in the above-identified patent and that said Letters Patent is hereby corrected as shown below:

Column 4,
After claim 1, add the following claims:

2. The hydraulic system defined in Claim 1 further including a second pressure limiting valve connected to said pump for limiting the magnitude of said pressurized hydraulic fluid delivered to said line.

3. The hydraulic system defined in Claim 1 wherein said control valve is biased to normally operated in said first mode.

4. The hydraulic system defined in Claim 1 wherein said control valve is movable between a first position for not providing pressurized fluid in said line to said clutch and a second position for providing pressurized fluid in said line to said clutch.

5. The hydraulic system defined in Claim 4 wherein said control valve is biased toward said first position by a spring.

6. The hydraulic system defined in Claim 1 wherein said pressure limiting valve is operable to provide either a first predetermined magnitude of pressurized fluid or a second predetermined magnitude of pressurized fluid in said line.

7. The hydraulic system defined in Claim 1 wherein said pressure limiting valve is responsive to the presence of said pressurized fluid in said line in excess of a predetermined magnitude for varying the magnitude thereof.

8. The hydraulic system defined in Claim 7 wherein said pressure limiting valve includes a spring for determining said predetermined magnitude.

9. The hydraulic system defined in Claim 1 wherein said line includes first and second line portions, and wherein said control valve is connected by said first line portion to said pump and by said second line portion to said clutch.

10. The hydraulic system defined in Claim 9 wherein said pressure limiting valve is connected between first and second line portions.

UNITED STATES PATENT AND TRADEMARK OFFICE
CERTIFICATE OF CORRECTION

PATENT NO.   : 6,095,297
DATED        : August 1, 2000
INVENTOR(S)  : Theodor Bosl, Jakob Mayer, and Johann Reisch It is certified that error appears in the above-identified patent and that said Letters Patent is hereby corrected as shown below:

11. The hydraulic system defined in Claim 10 wherein said pressure limiting valve is responsive to the presence of said pressurized fluid in said second line portion for varying the magnitude of said pressurized fluid in said first line portion.

Signed and Sealed this

Twenty-seventh Day of November, 2001

*Attest:*

NICHOLAS P. GODICI
*Attesting Officer*        *Acting Director of the United States Patent and Trademark Office*